(12) United States Patent
Korobkov et al.

(10) Patent No.: US 7,206,350 B2
(45) Date of Patent: Apr. 17, 2007

(54) OFDM MULTIPLE SUB-CHANNEL COMMUNICATION SYSTEM

(75) Inventors: Dmitri Korobkov, Frankurt/Main (DE); Randy Howell, Toronto (CA); Alex Dolgonos, Thornhill (CA)

(73) Assignee: Unique Broadband Systems, Inc., Concord, Ontario (CA)

( * ) Notice: Subject to any disclaimer, the term of this patent is extended or adjusted under 35 U.S.C. 154(b) by 572 days.

(21) Appl. No.: 10/166,872

(22) Filed: Jun. 11, 2002

(65) Prior Publication Data
US 2003/0123383 A1   Jul. 3, 2003

Related U.S. Application Data

(60) Provisional application No. 60/296,740, filed on Jun. 11, 2001.

(51) Int. Cl.
*H04K 1/10* (2006.01)
*H04J 11/00* (2006.01)
*G06F 17/17* (2006.01)
*H04Q 7/20* (2006.01)

(52) U.S. Cl. ............... 375/260; 370/208; 370/210; 708/313; 455/422

(58) Field of Classification Search ............... 375/260, 375/148, 330; 708/313; 455/422; 370/208, 370/210
See application file for complete search history.

(56) References Cited

U.S. PATENT DOCUMENTS 5,629,929 A * 5/1997 Blanchard et al. ......... 370/201
5,933,421 A    8/1999 Alamouti et al.
6,400,699 B1 * 6/2002 Airy et al. ................. 370/329
6,487,252 B1 * 11/2002 Kleider et al. ............. 375/260
6,594,322 B2 * 7/2003 Dapper et al. ............. 375/330
6,687,288 B1 * 2/2004 Shteiman ................... 375/222
6,898,235 B1 * 5/2005 Carlin et al. ............... 375/219
2001/0037351 A1 * 11/2001 Hellberg .................... 708/313
2002/0055356 A1 * 5/2002 Dulin et al. ................ 455/422
2002/0136276 A1 * 9/2002 Franceschini et al. ...... 375/148

FOREIGN PATENT DOCUMENTS

WO   WO 00/79817 A1   12/2000
WO   WO 01/05032 A1   1/2001

* cited by examiner

*Primary Examiner*—Mohammed Ghayour
*Assistant Examiner*—Cicely Ware
(74) *Attorney, Agent, or Firm*—Hodgson Russ LLP

(57) ABSTRACT

A transmitter and corresponding method for transmitting an OFDM signal in a communications channel, including a plurality of base-band OFDM modulators, each for modulating a respective data signal onto a plurality of orthogonal sub-carriers and outputting a respective sub-channel OFDM signal; and a fast convolution filter and up-converter for applying fast convolution filtering and digital up-conversion to the sub-channel OFDM signals to output a combined OFDM signal that includes each of the sub-channel OFDM signals, the fast convolution and up-converter filtering each of the sub-channel OFDM signals and frequency shifting all of the sub-channel signals to respective designated frequencies within the combined OFDM signal. A corresponding receiver is also provided.

5 Claims, 8 Drawing Sheets

OFDM MULTIPLE SUB-CHANNEL COMMUNICATION SYSTEM

This application claims priority to and the benefit of U.S. provisional patent application No. 60/296,740 filed Jun. 11, 2001.

BACKGROUND OF THE INVENTION

The present invention relates to the transmission and reception of orthogonal frequency division multiplexed (OFDM) signals, and more particularly, to communications systems using OFDM to communicate information in a multiple user two-way communication system.

OFDM is a bandwidth efficient multi-carrier modulation technique where a data stream is divided into a set of lower rate digital data streams, each of which is modulated onto a separate data signal. Each data signal or sub-carrier have distinct carrier frequencies. OFDM is currently used in one-way wireless broadcasts of digital television and digital radio signals where it has demonstrated its robustness to certain types of channel impairments such as multi-path fading.

In OFDM, to avoid mutual interference between the set of sub-carriers the frequency spacing $\Delta f$ between sub-carriers is chosen such that over time interval T the spectrum of each sub-carrier has a null at the other sub-carrier frequencies (orthogonal sub-carriers). For a system generating baseband samples of the OFDM signal at a sampling rate of N/T and where the number of sub-carriers is less than or equal to N, this orthogonality constraint can be efficiently realized by setting $\Delta f=1/T$ so that exactly N baseband samples of the OFDM signal is generated over time T. If the number of samples N over the orthogonality interval T is a power-of-two value (i.e., $N=2^k$ where k is an integer greater than zero) the process of modulating the data streams onto the set of sub-carriers can be efficiently implemented via an Inverse Fast Fourier Transform (IFFT). To recover the set of data streams from the set of sub-carriers at the OFDM receiver a Fast Fourier Transform (FFT) can be employed.

Often, the communication channel into which the transmitter 10 transmits is divided into a number of frequency sub-channels to permit multiple users to access the system. A limitation of prior OFDM systems that propose the use of multiple sub-channels that the transmitters and receivers of these systems are configured such that once the sub-channels have been allocated the sub-channels are static in that they can not be dynamically varied in quick response to changes in demands placed on system resources, leading to inefficient use of bandwidth.

Thus, there is a need for a transmitter and receiver architecture that is adapted for a multiple user communications system that enables the use of band-width efficient transmissions. More particularly, there is a need for an adequate filtering and upconversion structure to permit an OFDM transmitter to create multiple sub-channels in a dynamic fashion where the frequency position and frequency width of the sub-channels can quickly change from one time instance to the next. Similarly, a filtering and downconversion process is required at the OFDM receiver to recover the data from the various sub-channels it receives.

SUMMARY OF THE INVENTION

According to one aspect of the invention, there is provided a transmitter for transmitting an OFDM signal in a communications channel, including a plurality of base-band OFDM modulators, each for modulating a respective data signal onto a plurality of orthogonal sub-carriers and outputting a respective sub-channel OFDM signal; and a fast convolution filter and up-converter for applying fast convolution filtering and digital up-conversion to the sub-channel OFDM signals to output a combined OFDM signal that includes each of the sub-channel OFDM signals, the fast convolution and up-converter filtering each of the sub-channel OFDM signals and frequency shifting all of the sub-channel signals to respective designated frequencies within the combined OFDM signal. A method for implementing the transmitter is also provided.

According to another aspect of the invention, there is provided a receiver for receiving a combined OFDM signal that includes a plurality of sub-channel OFDM signals, the receiver including a buffer and FFT for receiving the combined OFDM signal and performing an FFT thereon to output a frequency domain signal, each of the sub-channel OFDM signals occupying assigned frequency ranges within the frequency domain signal, and a plurality of processing chains each associated with a sub-channel. Each processing chain includes a fast convolution filter and digital downconverter for extracting from the FFT of the combined OFDM signal the sub-channel OFDM signal occupying the assigned frequency range of the associated sub-channel and performing an IFFT on the extracted sub-channel OFDM signal, and an OFDM demodulator for demodulating the sub-channel OFDM signal output from the fast convolution and digital downconvertor.

DESCRIPTION OF THE PREFERRED EMBODIMENTS

A description of the preferred embodiment of the present invention is discussed in detail. Many modifications to this preferred embodiment are possible without departing from the general spirit and scope of the invention, and such modifications will be obvious to those skilled in the art.

Figure 1:
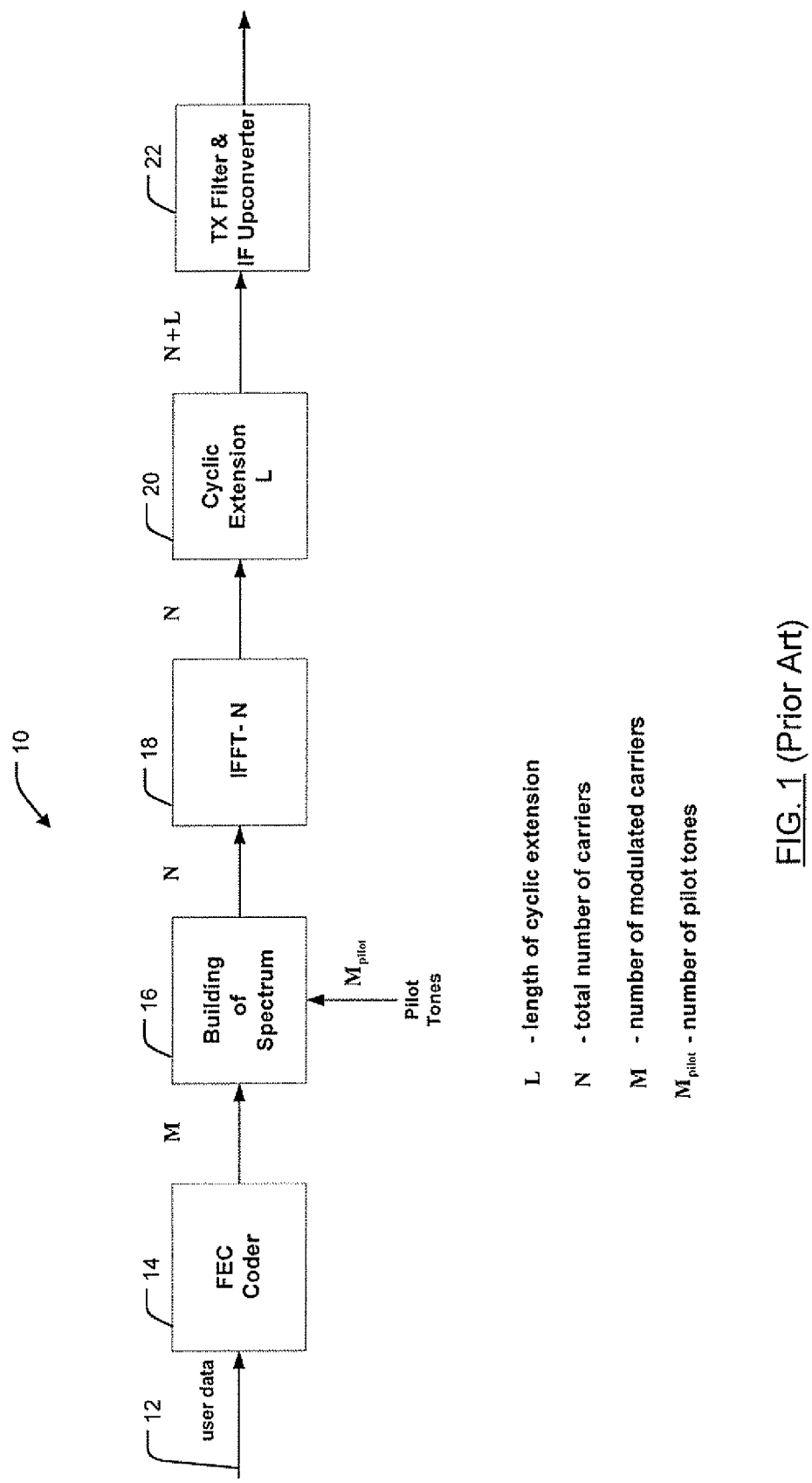
FIG. 1 is a block diagram of an OFDM baseband transmission engine.

The general principles of FFT-based OFDM signal transmission can be described with reference to FIG. 1, representing a block diagram of a typical OFDM transmission engine. The OFDM transmission engine 10 receives a data stream 12 from a source. A Forward Error Correction (FEC)

block 14 receives that input data stream and applies a coding scheme to introduce error-correcting and/or error-detecting redundancy into the data stream. As FEC coding typically spans the set of OFDM sub-carriers, an OFDM system can take advantage of frequency diversity to mitigate losses due to frequency selective fading. Immediately after FEC coding, a spectrum builder block 16 divides the sequence of coded bits into segments of m*M bits which is further sub-divided into M sub-segments of m bits (M=number of modulated carriers). Each sub-segment of m bits is mapped to a complex number according to a given signal constellation rule. For example, quadrature phase shift keying (QPSK) with m=2 or any $2^m$-ary quadrature amplitude modulation (QAM) scheme such as 16-QAM (m=4) and 64-QAM (m=6). The length M set of m-bit data symbols will be employed to modulate M OFDM sub-carriers. The set of M data symbols are written to a length N sequence (N=total number of sub-carriers), initially filled with zeros (M≦N). Each position of the length N sequence uniquely represents a single OFDM sub-carrier. Some of the positions can be occupied by a set of $M_{pilot}$ values (commonly referred to as pilot tones) known to the OFDM receiver in order to assist it to overcome channel impairments. The remaining $N-M-M_{pilot}$ positions remain as zero values to represent blank carriers. Such blank carriers are useful to set a frequency guard space between adjacent channels or sub-channels to avoid mutual interference. After spectrum building 16, each successive sequence of N complex values generated from successive segments of m*M coded bits are Inverse Fast Fourier Transformed (IFFT) in IFFT block 18. This modulates the set of N complex values onto the N OFDM sub-carriers. By dividing the input data stream into N sub-carriers the symbol duration T will be become long relative to that of the multipath delay spread. As a result the problem of multipath induced inter-symbol interference (ISI) is substantially reduced for an OFDM system. To almost completely eliminate inter-symbol interference a guard time is introduced for each OFDM symbol. This guard time usually takes the form of a cyclic extension of the OFDM symbol. For example, L samples at the beginning of the N sample OFDM symbol can be copied to the end of the symbol. This procedure is denoted in Cyclic Extension block 20. This serves to lengthen each baseband OFDM symbol to N+L samples. The overall OFDM symbol duration becomes $T_{OFDM}=T+T_{Guard}$ where $T_{Guard}$ is the duration of the guard interval of L baseband samples. After adding the cyclic extension the baseband OFDM symbol undergoes filtering and upconversion 22 to convert the baseband waveform to an appropriate intermediate frequency (IF) form prior to conversion to a radio frequency (RF) form suitable for transmission.

Figure 2:
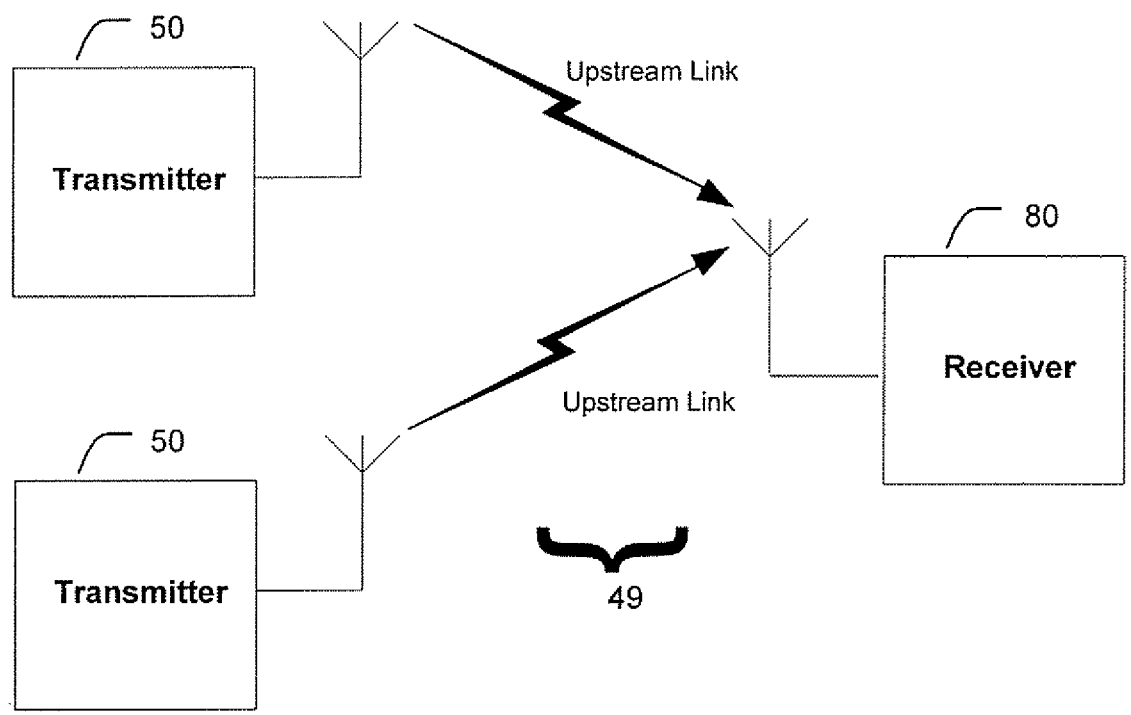
FIG. 2 is a block diagram of an OFDM communications system in accordance with one embodiment of the present invention.

With reference to FIG. 2, in one embodiment a communications system according to the invention includes a plurality of wireless OFDM transmitters 50, and at least one OFDM receiver 80. The OFDM transmitters 50 may be part of two-way (i.e. transmit and receive enabled) subscriber units, and the OFDM receiver 80 part of a two-way base station. In such a configuration, the OFDM transmitters 50 transmit upstream communications signals to the OFDM receiver 80 through a communications channel 49 that is available for use by the communications system. In the communications system of the present invention, the communications channel 49 available for use by the system is broken up into a number of sub-channels, with each transmitter 50 being configured such that the number of sub-channels and the bandwidth of the sub-channels can be dynamically varied from one time slot to the next.

As with most communication systems, the allocation of resources to a particular user/transmitter/receiver is governed by a Media Access Controller (MAC). In this context the MAC assigns sub-channels (and the sub-channel bandwidth) as well as transmission times. Hence, channel resources can be divided into a frequency component (Frequency Division Multiple Access or FDMA) as a time component (Time Division Multiple Access or TDMA). It will be appreciated that a number of suitable MAC layer designs could be used with the system of the present invention, however MACs that support both FDMA and TDMA resource assignment are preferred.

It will be appreciated that in the context of the OFDM transmitter 10 decribed above in respect of FIG. 1, the use of dynamic sub-channels would place severe demands on the filtering and upconversion block 22. By way of explanation, a set of N complex values used to modulate the set of N sub-carriers for one sub-channel can be correctly positioned in the channel spectrum by placing the values in a sequence representing the complete set of sub-carriers for an entire channel and then taking an IFFT. The use of an IFFT spanning the entire channel effectively implements a first stage intermediate frequency (IF) frequency upconversion for each sub-channel. The problem that arises however is that the filtering workload dramatically increases following upconversion. After IF upconversion the sampling frequency 1/T for the sub-channel is increased to Q/T where Q represents the interpolation or upsampling factor and is equal to the ratio of the sampling frequency of the entire channel to that of the sub-channel. Where there were N+L baseband samples for an OFDM symbol of duration $T_{OFDM}$ for a sub-channel, the number of samples will increase to Q*(N+L) after IF upconversion. The larger number of samples will increase the filtering workload. A further complication is if a user occupies more than one sub-channel. It will be difficult to filter the combined sum of upconverted sub-channels as the filter will require multiple passbands and stopbands.

Thus, there is a need for an adequate filtering and upconversion structure to permit an OFDM transmitter to create multiple sub-channels in a dynamic fashion where the frequency position and frequency width of the sub-channels can quickly change from one time instance to the next. Similarly, a filtering and downconversion process is required at the OFDM receiver to recover the data from the various sub-channels it receives.

On overview of the present invention having been provided, the sub-channel structure of the communications system of the present invention, as well as the structure of the transmitter 50 and receiver 80 used in the communications system, will now be described in greater detail.

1. OFDM Sub-Channel Structure

The main system parameters defining the multiple sub-channel OFDM communication system of the present invention are listed below in Table 1.

TABLE 1

Main system parameters of an OFDM communication channel

| Parameter | Description |
| --- | --- |
| $F_N$ | Sampling frequency (Nyquist frequency) of system |
| $P_{max}$ | $2^{Pmd\backslash}$ = Maximum available FFT size |
| $q_{max}$ | $2^{qmd\backslash}$ = Maximum number of sub-channels |
| $\Theta$ | Channel bandwidth, $\Theta \leq F_N$ |

An individual sub-channel is governed by the parameters listed below in Table 2.

TABLE 2

Main system parameters of an OFDM sub-channel

| Parameter | Description |
|---|---|
| $F_C^{(n)}$ | Center frequency offset of sub-channel n relative to the channel center frequency |
| $p_n$ | Time scaling factor for sub-channel n, $0 \leq p_n \leq P_{max}$ |
| $q_n$ | Bandwidth scaling factor for sub-channel n, $0 \leq q_n \leq q_{max}$ |

The center frequency of sub-channel n is $F_C^{(n)}$. A fundamental sub-channel unit has a bandwidth of $F_N/2^{q_{max}}$. The bandwidth scaling factor $q_n$ defines the bandwidth of a sub-channel in relation to the system sampling frequency $F_N$ (The Nyquist frequency). The bandwidth of sub-channel n is $F_N^{(n)}$ and is defined as $$F_N^{(n)} = F_N/2^{q_n}, \quad 0 \leq q_n \leq q_{max} \quad (1)$$

The sum of all sub-channel bandwidths cannot exceed the Nyquist frequency of the system:

$$\sum_{n=0}^{K-1} F_N^{(n)} \leq F_N, \quad (2)$$

where K is the number of upstream sub-channels presently in service for one communication channel.

In some embodiments of the communications system of the present invention, the number of sub-channels is variable and change from one instant of time to the next. Users may be permitted to merge sub-channel units together or a sub-channel may be broken up into smaller units. Alternatively, some sub-channels may be left vacant temporarily. Some sub-channels may be larger or smaller (i.e. have more or fewer carriers) than others. As indicated above, the actual sub-channel allocation is dependent on the MAC layer.

An alternative way to express equation (2) is $$\sum_{n=0}^{N_C-1} 2^{-q_n} \leq 1 \quad (3)$$

The bandwidth scaling factor $2^{q_n}$ in equation (1) represents the frequency interpolation or upsampling factor required to upsample the sub-channel from a sampling frequency of $F^{N(n)}$ to $F_N$ prior to transmission. The upsampling or interpolation factor for sub-channel n is defined $$Q_n = 2^{q_n} \quad (4)$$

At baseband, the number of samples $N^{(n)}$ in the OFDM symbol orthogonality interval $T^{(n)}$ for sub-channel n is $$N^{(n)} = 2^{p_n} \quad (5)$$

The orthogonality interval $T^{(n)}$ is thus defined as $$T^{(n)} = \frac{N^{(n)}}{F_N^{(n)}} = \frac{2^{p_n + q_n}}{F_N} \quad (6)$$

The cyclic extension to the baseband OFDM symbol for sub-channel n comprises $L^{(n)}$ samples taken from the $N^{(n)}$ sample orthogonality interval. The duration of the guard interval is $$T_{Guard}^{(n)} = \frac{L^{(n)}}{F_N^{(n)}} \quad (7)$$

Usually, it is necessary that $T_{Guard}^{(n)}$ be greater than or equal than the multipath delay spread of the channel. The overall length of the baseband OFDM symbol for sub-channel n is $$T_{OFDM}^{(n)} = T^{(n)} + T_{Guard}^{(n)} = \frac{N^{(n)} + L^{(n)}}{F_N^{(n)}} \quad (8)$$

Usually, the number of baseband guard samples $L^{(n)}$ is a power-of-two factor of $N^{(n)}$ (e.g., $L^{(n)} = N^{(n)}/2^k$ where $0 \leq k \leq p_n$) but is not absolutely necessary. In some cases $L^{(n)}$ may be a power-of-two value (i.e., $L^{(n)} = 2^k$ where $k \geq 0$).

The frequency spacing between sub-carriers for sub-channel n is defined as $$\Delta f_n = \frac{F_N^{(n)}}{N^{(n)}} = \frac{F_N}{2^{p_n + q_n}} \quad (9)$$

For the special case of a single sub-channel spanning the entire communication channel bandwidth the minimum sub-carrier spacing is $$\Delta f_{min} = \frac{F_N}{2^{p_{md}\setminus}} \quad (10)$$

2. OFDM Transmitter

Figure 3:
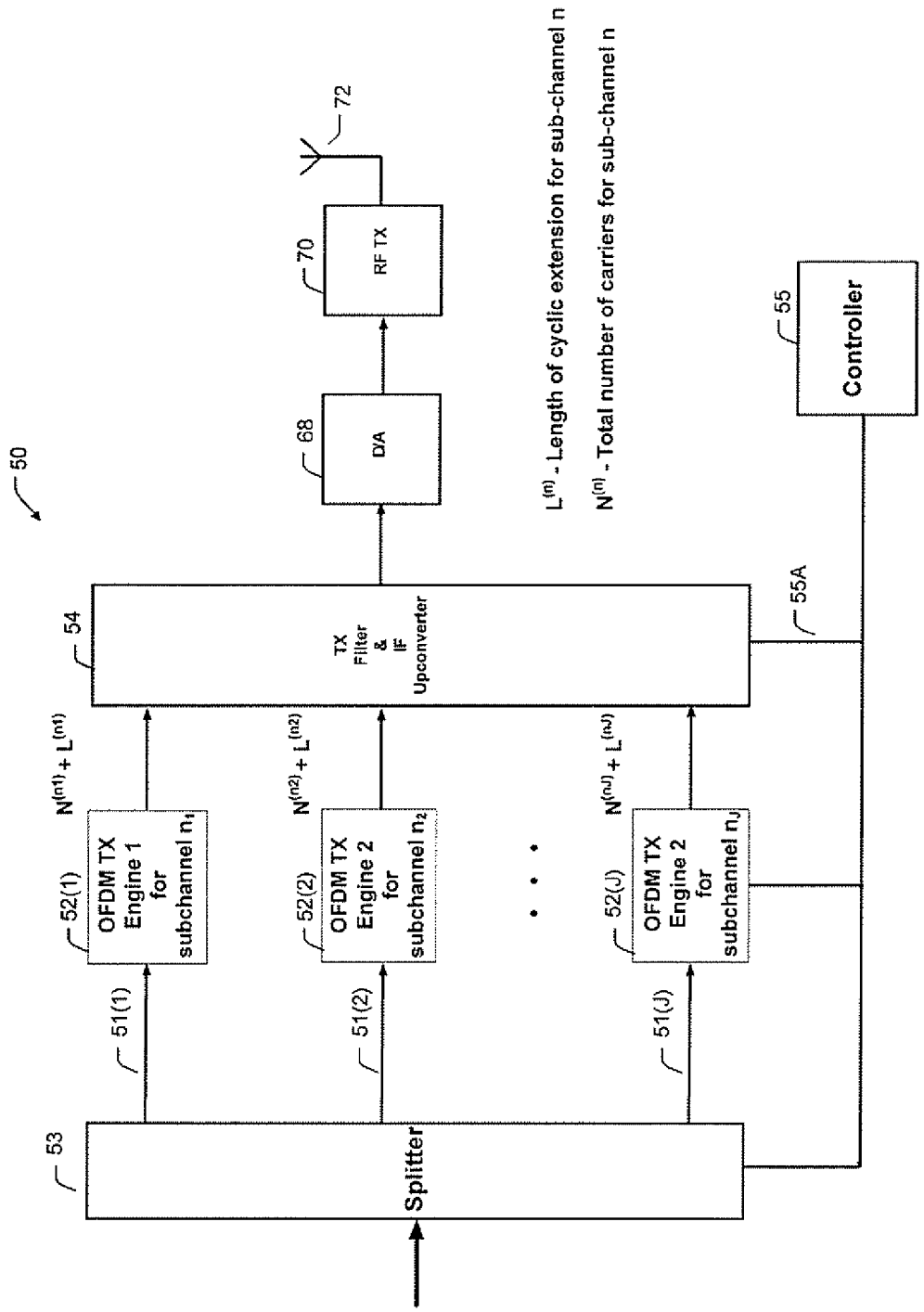
FIG. 3 is a block diagram of a multi-channel OFDM transmitter of the communications system of FIG. 2.

A preferred embodiment of the OFDM transmitter 50 is shown in block diagram form in FIG. 3. A controller 55 that receives resource allocation information from the MAC layer of the OFDM system coordinates the operation of the components that make up the OFDM transmitter 50. The transmitter 50 includes J OFDM transmission (TX) engines or modulators 51(1)–52(J) for generating J OFDM sub-channels numbered $n_1, n_2, \ldots n_J$ (as used herein, the reference n without subscript refers to a generic sub-channel that is illustrative of the sub-channels $n_1, n_2, \ldots n_J$). A block of user data is segmented by data splitter 53 into a set of J data blocks that form the input 51(1)–51(J) into the J OFDM modulators. The data input 51(1)–51(J) into each sub-channel is processed using the respective OFDM TX engine 52(1)–52(J) to generate a sequence of OFDM symbols of length $N^{(n)} + L^{(n)}$ for each sub-channel $n_1, n_2, \ldots n_J$. Each of the OFDM TX modulators 52(1)–52(J) is effectively a baseband OFDM transmitter having a configuration similar to the baseband transmitter 10 shown in FIG. 1 and described above (i.e. each TX modulator includes an FEC coder 14, spectrum builder 16, IFFT block 18 and cyclic extension block 20).

The sequence of OFDM symbols for each sub-channel is processed via a fast convolution technique in a TX filter & intermediate frequency (IF) upconverter 54, which filters the OFDM sequence generated for each sub-channel n and upsamples by a factor of $Q_n$ and performs a frequency shift to a center frequency of $F_C^{(n)}$ relative to the carrier frequency of the channel. The output of filter and IF upconverter 54 is the summed output of all sub-channels $n_1$, $n_2$, ... $n_J$ at a sampling rate of $F_N$. This output is then fed into Digital-to-Analog (D/A) converter 68 and is converted to a radio frequency (RF) form suitable for transmission by RF converter 70. The signal is then radiated via antenna 72.

Figure 4:
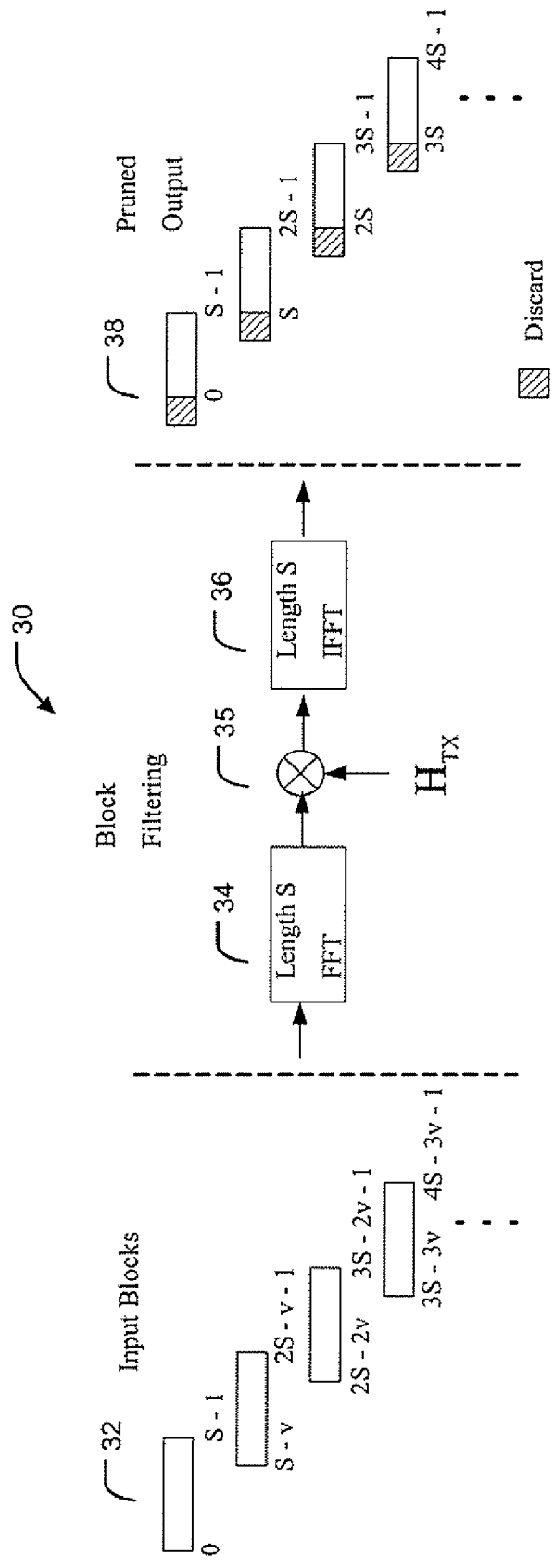
FIG. 4 shows a block diagram of a baseband Overlap-and-Save Fast Convolution filtering method.
Figure 5:
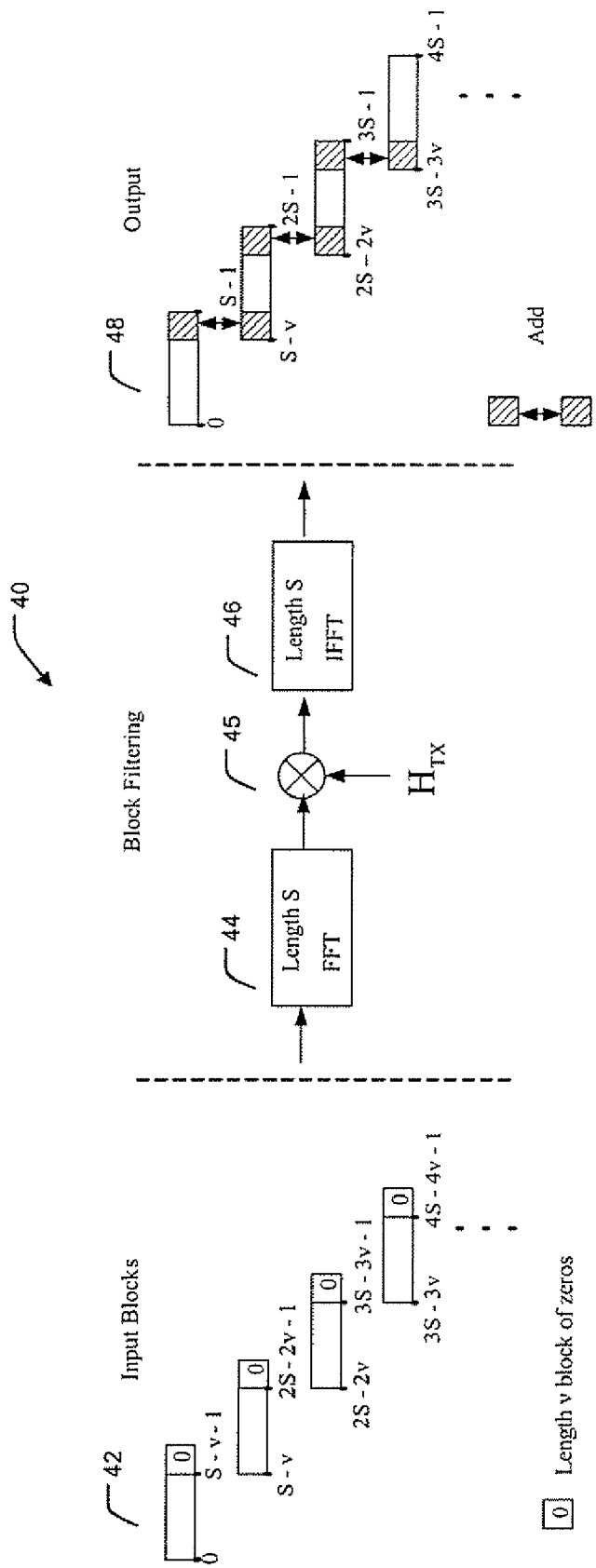
FIG. 5 shows a block diagram of a baseband Overlap-and-Add Fast Convolution filtering method.

The TX filter & IF upconverter 54 will now be described in greater detail. As suggested above, there is a need for an efficient filtering and upconversion structure to permit the OFDM transmitter 50 to generate multiple sub-channels in a dynamic fashion so the frequency position and frequency width of the sub-channels can quickly change from one time instant to the next. In the present invention, a solution is provided via use of FFT-based fast convolution filtering combined with FFT-based upsampling/downsampling. By way of background, the method of fast convolution filtering can be described with reference to FIGS. 4 and 5. There are two distinct fast convolution filtering techniques well known in the art. Namely, Overlap-and-Save (FIG. 4) and Overlap-and-Add (FIG. 5). The Overlap-and-Save method is sometimes referred to as Overlap-and-Discard.

It is known in the art that linear filtering of a signal in the time domain with a finite impulse response (FIR) filter is a linear convolution process. It is also known that the convolution of two signals can be performed by multiplying the Fourier transform of one signal with the Fourier transform of the other and then taking the inverse Fourier transform of the product spectrum. By performing the convolution with a Discrete Fourier Transform (DFT) method such as an FFT one can significantly reduce the workload per output point. The method of performing convolution via a DFT is often referred to as Fast Convolution. However, normal convolution is a continuous process whereas a DFT and Fast Convolution is a block process that partitions the data into blocks. Multiplying the DFT calculated frequency spectra of two sequences following by an inverse DFT of the product spectrum is identical to the circular convolution of the two sequences. Circular convolution suffers from aliasing effects due to circular wrap-around. In this case there will be $N_h-1$ data points that will undergo circular wrapping where $N_h$ is the number of coefficients of filter function h. Care must be taken to avoid artifacts due to the block boundaries.

The two well-known Fast Convolution techniques that circumvent blocking artifacts are the Overlap-and-Add and Overlap-and-Save methods. Both techniques process data blocks using a length S DFT and successive blocks overlap the previous block by v data points where $N_h-1 \leq v \leq S-1$. For maximum efficiency it is desirable that $v=N_h-1$, however this requirement is not absolutely necessary.

In the Overlap-and-Save method the circular wrap around problem is avoided by discarding those data points where aliasing occurs. The Overlap-and-Save process 30 is illustrated in FIG. 4. In this example, the first $N_h-1$ positions of the block output of IFFT 36 are where the circular wrap-around occurs. Data 32 is partitioned into input blocks 34 of length S and successive blocks overlap by v data points. Each length S block is Fourier transformed using a length S FFT 34 and is then multiplied at mixer 35 by the length S FFT of the filter function $H_{TX}$. The product spectrum is inverse transformed back to the time domain using a length S IFFT 36. Each filtered block is pruned to discard the first v data points and the remaining S-v points of each output block 38 are merged to create the filtered time series.

In the Overlap-and-Add method 40 of FIG. 5 the last v elements of each input block 42 are set to zero. As such the resultant circular convolution result matches the linear convolution result and only the filter transients that occur at the beginning and end of each output block need be eliminated. These transients are the result of the artificial block boundaries and can be eliminated by adding the end transient of one block with the start transient of the next block. In this example, all filter transients are shifted to the end of each length S block 48 output from length S IFFT 46. Data is partitioned into blocks 42 of length S-v and appended with v zeros to bring the block length to S. Successive blocks overlap by v data points. Each length S block is Fourier transformed using a length S FFT 44 and is then multiplied at mixer 45 by the length S FFT of the filter function $H_{TX}$. The product spectrum is inverse transformed back to the time domain using a length S IFFT 46. In merging the output blocks 48 together the region of overlap between successive blocks is added together.

The Overlap-and-Save and Overlap-and-Add techniques can be adjusted in many ways to produce the same result. The most obvious way is to adjust the overlap value v. However, the values of overlap are restricted to $N_h-1 \leq v \leq S-1$. Values of $v=N_h-1$ are preferred for efficiency. If v is greater than $N_h-1$ then over two successive blocks the Overlap-and-Save will calculate $v-N_h+1$ output points twice. For the Overlap-and-Add method $v-N_h+1$ output points of each length S output block will identically zero. Even with this loss in efficiency, the method to be described here may require that v be larger than $N_h-1$ but still in the range $N_h-1 \leq v \leq S-1$.

Another possible modification is to adjust the time delay of the filter function 35. If the group delay of the filter and other block delays are corrected for, than the aliased or transients points can be positioned anywhere in the length S output block. For example, by appropriate adjustment of the filter function the points to be discarded in the Overlap-and-Save method could be the last v output points instead of the first v points. Another example is that all transients in the Overlap-and-Add method could be shared between the beginning and end of each output block as opposed to shifting all transients to the end of each output block.

Figure 6:
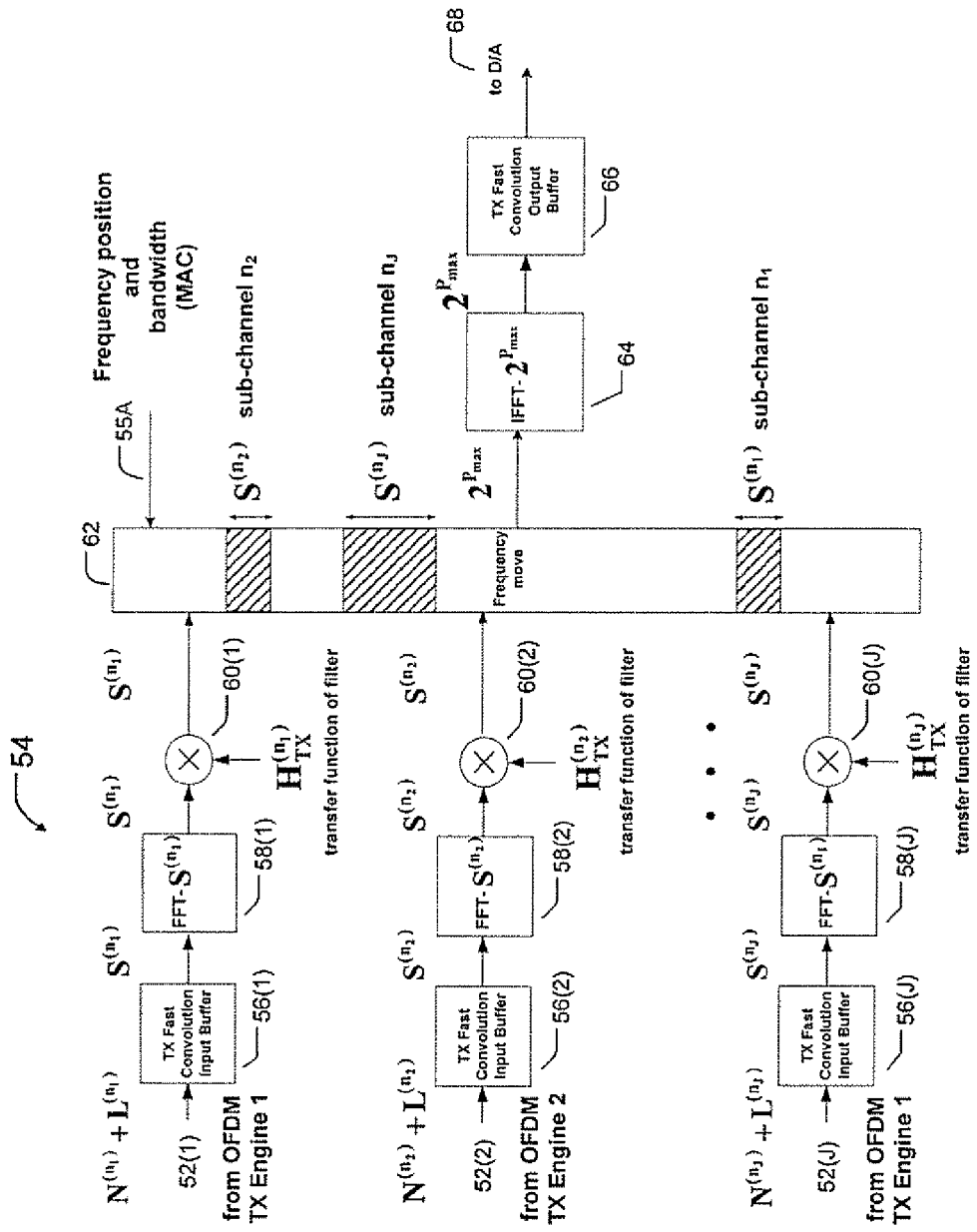
FIG. 6 shows a block diagram of the filtering and IF upsampling section of the multi-channel OFDM transmitter of FIG. 3.

The TX Filter & IF uconverter 54 will now be described with reference to FIG. 6. The Filter and IF upconverter 54 includes J sub-channel processing chains, each of which receives segmented user data from a respective OFDM modulator 52(i) (where i denotes a representative processing chain for the sub-channel n), and each of which includes a TX fast convolution input buffer 56(i), an FFT 58(i) and a filter function 60(i). A sequence of length $N^{(n)}+L^{(n)}$ OFDM symbols for sub-channel n is partitioned into blocks of length $S^{(n)}$ in block 56(i). The fast convolution block size $S^{(n)}$ is calculated as $$S^{(n)} = \frac{2^{P_{mcA}}}{Q_n} = 2^{P_{mcA}-q_n} \tag{11}$$

Successive blocks overlap by $v^{(n)}$ data points and $v^{(n)}$ is limited to the range $$N_{h,TX}^{(n)} - 1 \leq v^{(n)} \leq S^{(n)} - 1 \tag{12}$$

Where $$N_{h,TX}^{(n)}$$

is the number of filter coefficients for the transmit filter function. For either the Overlap-and-Save or Overlap-and-Add fast convolution methods, it is required that $$Q_{n_1}v^{(n1)}=Q_{n_2}v^{(n2)}= \ldots =Q_{n_j}v^{(nj)}=v_Q \qquad (13)$$

This ensures that the number of points discarded from each fast convolution output block for the Overlap-and-Save method is the same for all sub-channels $n_1, n_2, \ldots n_J$ generated by the same transmitter. It also guarantees that the number of points to be overlapped and added for the Overlap-and-Add method is the same for all sub-channels generated by the same transmitter.

For the Overlap-and-Save fast convolution technique each length $S^{(n)}$ block in buffer 56($i$) is filled with signal values unless insufficient values remain in the finite sequence of OFDM symbols and the remaining positions are filled with zeros. For the Overlap-and-Add fast convolution technique the first $S^{(n)}-v^{(n)}$ of each length $S^{(n)}$ block of buffer 56($i$) is filled with signal values and the remaining $v^{(n)}$ positions are filled with zeros. If insufficient signal values remain for the last fast convolution block of the sequence than the remaining positions are also filled with zeros.

Each length $S^{(n)}$ fast convolution block 58($i$) for sub-channel n is converted to the frequency domain using a length $S^{(n)}$ FFT 58($i$). The frequency domain signal data for channel n is then multiplied by the length $S^{(n)}$ FFT of the FIR transmit filter function 60($i$). The transmit filter function for channel n is $$h_{TX}^{(n)}$$

and has a length of $$N_{h,TX}^{(n)}$$

filter coefficients.

It is desirable that the filter function be time shifted to correct for any filter group delays or blocking delays. This has the advantage that the first output point from each block of output from TX fast convolution output buffer 66 is free of aliasing or filter transients. Let $$A_{TX}^{(n)} = \text{length } S^n \text{ FFT of } h_{TX}^{(n)} \qquad (14)$$

$$A_{TX}^{(n)}(f) = \text{value of } A_{TX}^{(n)} \text{ at frequency } f \qquad (15)$$

Where $$h_{TX}^{(n)}$$

is extended by $$S^n - N_{h,TX}^{(n)}$$

zeros to perform the transform and f is a frequency value on the length $S^{(n)}$ FFT frequency grid with sampling frequency $F_N^{(n)}$. Note that a time shift is represented in the frequency domain as a linear phase shift over frequency. The recommended (time shifted) filter transfer function $$H_{TX}^{(n)}$$

to be employed in filter function block 60($i$) is $$H_{TX}^{(n)}(f) = \begin{cases} A_{TX}^{(n)}(f)e^{-j2\pi f\left(v^n - \frac{N_{TX}^{(n)}-1}{2}\right)} & \text{for Overlap-and-Save} \\ A_{TX}^{(n)}(f)e^{j2\pi f\left(\frac{N_{TX}^{(n)}-1}{2}\right)} & \text{for Overlap-and-Add} \end{cases} \qquad (16)$$

Upsampling and frequency shift steps are performed in frequency shift block 62. Block 62 receives MAC layer information such as sub-channel and frequency position information from controller 55 via input 55A. Block 62 generates a $2^{Pmax}$ long sequence of complex values. This sequence represents the frequency spectrum of the entire channel for an orthogonal (FFT) frequency grid of $2^{Pmax}$ frequency bins with a sampling frequency of $F_N$. This sequence is set to zero at the beginning of each fast convolution block and the set of fast convolution blocks for all sub-channels generated by the same transmitter start and end at the same time. The set of length $S^{(n)}$ frequency spectrum blocks, one for each sub-channel, on output from filter functions 60(1)–60(J) are copied to the $2^{Pmax}$ long sequence at a position matching its center frequency offset of $F_C^{(n)}$. After filling, the sequence of frequency shift block 62 is input into an IFFT block 64 where a length $2^{Pmax}$ IFFT is performed. The IFFT output represents the filtered time series following upsampling and frequency shifting.

The length $2^{Pmax}$ output sequence from IFFT block 64 is passed to the fast convolution output buffer 66. From equation (13) it will be noted that $Q_{n_1}v^{(n1)}=Q_{n_2}v^{(n2)}= \ldots =Q_{n_j}v^{(nj)}=v_Q$. For the Overlap-and-Save method the first $v_Q$ points need to be discarded from the beginning of each length $2^{Pmax}$ output from IFFT 64. For the Overlap-and-Add method the last $v_Q$ points of one block need to be overlapped and added with the first $v_Q$ points of the next block. The remaining points of the output blocks are appended to one another and passed to the Digital-to-Analog converter 68 shown in FIG. 3.

Depending on the choice of sub-channel parameters it also may be necessary to discard some points from the end of the burst of buffer 66. Let $N_S^{(n)}$ represent the number of OFDM symbols transmitted by sub-channel n in one communication burst. To transmit this set of $N_S^{(n)}$ OFDM symbols a fast convolution technique requiring $N_{FC}^{(n)}$ fast convolution blocks is employed. The number of fast convolution blocks required to transmit $N_S^{(n)}$ OFDM symbols for sub-channel n is $$N_{FC}^{(n)} = \text{ceil}\left(\frac{N_S^{(n)}(N^{(n)} + L^{(n)})}{S^{(n)} - v^{(n)}}\right), \quad (17)$$

where the function ceil rounds the argument to the nearest integer towards infinity.

Equation (17) applies for either the Overlap-and-Save and Overlap-and-Add methods. To ensure that the upsampled output from buffer 66 is exactly $Q_n N_s^{(n)} (N^{(n)}+L^{(n)})$ samples for the $N_S^{(n)}$ OFDM symbol burst it is necessary to discard some additional output points. Employing the recommended time shifted filter transfer function of equation (16), the following number of samples should be discarded from the end of the last fast convolution block in buffer 66:

$$N_{Discard}^n = \begin{cases} Q_n\{N_{FC}^n(S^{(n)} - v^{(n)}) - N_S^n(N^{(n)} + L^{(n)})\} & \text{for Overlap-and-Save} \\ Q_n\{N_{FC}^n(S^{(n)} - v^{(n)}) - N_S^n(N^{(n)} + L^{(n)})\} + v_Q & \text{for Overlap-and-Add} \end{cases} \quad (18)$$

Otherwise the last OFDM symbol will be elongated with the addition of a trailing edge consistent with a decaying filter transient. This could be tolerated in some circumstances, especially if the system has sufficient guard times between adjacent bursts from different transmitters. However, this problem can avoided for the Overlap-and-Save method by selecting values of $S^{(n)}$ and $v^{(n)}$ that result in $N_{Discard}^n=0$ for all sub-channels. An obvious choice is $S^{(n)}=2N^{(n)}$ and $v^{(n)}=N^{(n)}-L^{(n)}$. Not only does this set $N_{Discard}^n=0$ it also has the very desirable result that $N_{Discard}^n=N_S^n$. Hence, each input OFDM symbol results in a fast convolution block being generated.

It is clear from equation (18) that we cannot force $N_{Discard}^n=0$ for the Overlap-and-Add method. The last $v_Q$ points of an Overlap-and-Add fast convolution output block represent either zeros of filter transients. It is only by overlapping and adding the overlap region between successive blocks do we compensate for such transients. However, with the last block there is no additional blocks to overlap with and these last points $v_Q$ of the last Overlap-and-Add block represent a filter transient that should be discarded. To overcome this problem for the case of multiple sub-channels the burst length should be the same for all sub-channels, so that this discard operation is common to all. Or else, it may be necessary to transmit a trailing edge at the end of each burst.

Given its simpler structure compared to the Overlap-and-Add method and its advantages for a multiple sub-channel processor, the Overlap-and-Save fast convolution method is generally preferred for this invention, however both methods could be used.

In summary, the OFDM transmitter 50 generates a plurarity of sub-channels, each sub-channel representing an independent OFDM tansmission. The pluarity of sub-channels are generated in parallel using a Fast Convolution filtering process combined with digital upconversion. The Fast Convolution process includes a first stage (performed by components 56(i), 58(i) and 60(i) of FIG. 6) that includes the application of a frequency-domain filter to each sub-channel to set the spectral mask (transmission bandwidth and spectrum roll-off, etc). Following first-stage Fast Convolution filtering, filter transients are present due to the block-based processing. These transients are removed in a second-stage Fast Convolution filtering implemented by components 62, 64 and 66 of FIG. 6. The second stage includes upconversion of the pluarity of sub-channels via large IFFT buffer 62. The buffer 62 is the input for large IFFT 64 that represents a bandwidth greater than or equal to the channel bandwidth. By correct positioning of each sub-channel within the IFFT buffer 62, each sub-channel can be moved to its correct frequency position within the overall channel. The IFFT 64 implements a first stage of upconversion for all sub-channels plus serves as the IFFT processor for a second stage Fast Convolution filtering process. The Fast Convolution output buffer 66 operates on the sequence of Fast Convoltuion filtering blocks to remove filter transients to complete the Fast Convolution filtering process (either by discarding samples or overlapping and adding samples).

3. OFDM Receiver

Figure 7:
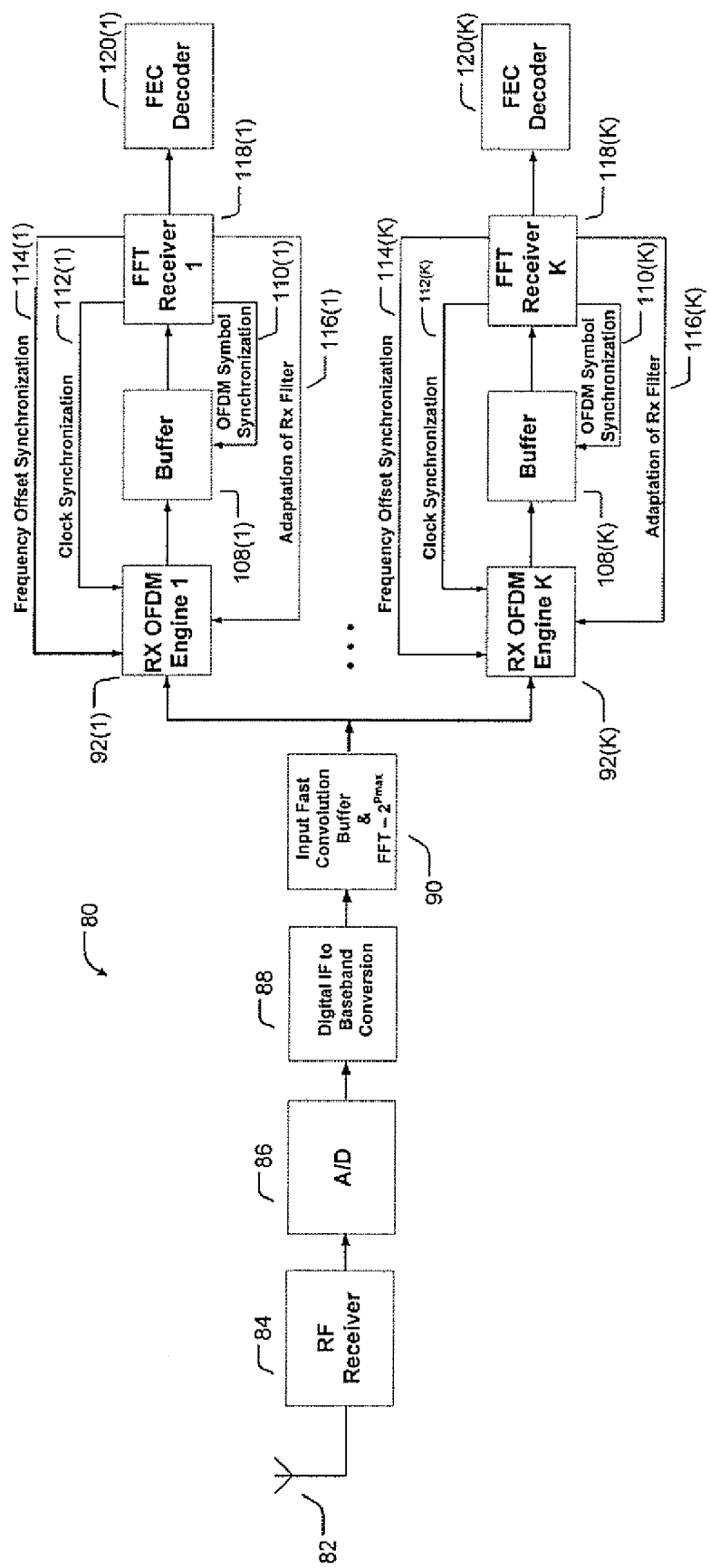
FIG. 7 shows a block diagram of a multi-channel OFDM receiver in accordance with an embodiment of the present invention that can be used in the communications system of FIG. 2.

An OFDM receiver 80 in accordance with a preferred embodiment of the present invention is shown in block diagram form in FIG. 7. In many respects it is a mirror image of the OFDM transmitter 50. The OFDM receiver 80 receives K sub-channels of data from one or more OFDM transmitters 50. The signal is received on antenna 82 and downconverted in downconverter 84 from the transmission carrier frequency to a suitable Intermediate Frequency (IF) form. The IF signal is passed to the Analog-to-Digital Converter 86 that converts the analog signal to digital samples. The digital samples are digitally donconverted in frequency from IF to baseband in IF downconverter 88 and the baseband samples are sent to fast convolution buffer and FFT 90. For OFDM signals transmitted using the Overlap-and-Save method, FFT 90 buffers data in blocks of $2^{Pmax}$ baseband samples and performs a length $2^{Pmax}$ FFT. Successive blocks are overlapped by $u_Q$ samples. For OFDM signals transmitted using the Overlap-and-Add method, a block is a set of $2^{Pmax}-u_Q$ samples extended by $u_Q$ zeros at the end. Successive blocks are overlapped by $u_Q$ samples.

In the transmitter, the baseband fast convolution overlap is defined as $$u^{(n)}=u_Q/Q_n \quad (19)$$

The overlap $u^{(n)}$ does not necessarily equal $v^{(n)}$ of the transmitter, but it is desirable that it should. Similar to $v^{(n)}$, $u^{(n)}$ is limited to the range $$N_{h,RX}^{(n)} - 1 \leq u^{(n)} \leq S^{(n)} - 1, \quad (20)$$

where $$N_{h,RX}^{(n)}$$

is the number of filter coefficients for the receive filter function.

The length $2^{Pmax}$ frequency spectrum output from FFT 90 is forwarded to each of K processing branches corresponding to a specific sub-channel. Each of the K branches includes a receive (RX) OFDM engine 92($i$), a buffer 108($i$) and an FFT receiver 118($i$). The length $2^{Pmax}$ frequency spectrum is processed in branch n (sub-channel n) by the receive OFDM engine 92($i$) where the portion of the spectrum corresponding to sub-channel n is extracted, shifted to 0 Hz baseband and filtered. The filtered output is sent to buffer 108($i$) which buffers the output of several fast convolution blocks for sub-channel n and each block is processed by FFT receiver 118($i$) which performs a length $N^{(n)}$ FFT to recover the signal values modulated on each sub-carrier. These values are sent to a conventional FEC decoder 120($i$) for decoding.

There are a number of feedback paths in the receiver design 80, typical of many OFDM systems. In each processing branch, a feedback path 114($i$) from the FFT receiver 118($i$) to the RX OFDM engine 92($i$) reports the value of the sampling clock offset (sampling clock error) for a sub-channel, which is calculated in FFT receiver 118($i$). This value is used in the receive OFDM engine 92($i$) to correct the signal. Feedback path 114($i$) contains an estimate of the carrier frequency offset (carrier frequency error) for a sub-channel and is again estimated in FFT receiver 118($i$). This value is used in the receive OFDM engine 92($i$) to correct the signal. OFDM symbol synchronization attempts to find the start of an OFDM symbol and the results of this synchronization procedure are employed in buffer 108($i$) via feedback path 110($i$) from FFT receiver 118($i$) The FFT receiver 118($i$) can also calculate an adjustment for the OFDM engine Rx filter 98 (FIG. 8) to compensate for channel impairments such as a channel impulse response longer than the OFDM guard interval (impulse response shortening). Feedback path 116($i$) is used to adapt the OFDM engine Rx filter.

These feedback paths permit the OFDM receiver 80 to individually correct for synchronization errors for the set of transmitters 50. If an individual sub-channel has guard sub-carriers at the edges of its spectrum where no energy is transmitted, the limit of frequency offset error for this sub-channel is a shift that would take its non-zero band edge to the edge of its allotted spectrum. Practically, this limit is less than amount. Note that the passband width of the filter employed in the receive OFDM engine 92($i$) should be wider than the passband of the transmit filter of transmit filter & IF upconverter 54 to accommodate such frequency shifts.

Figure 8:
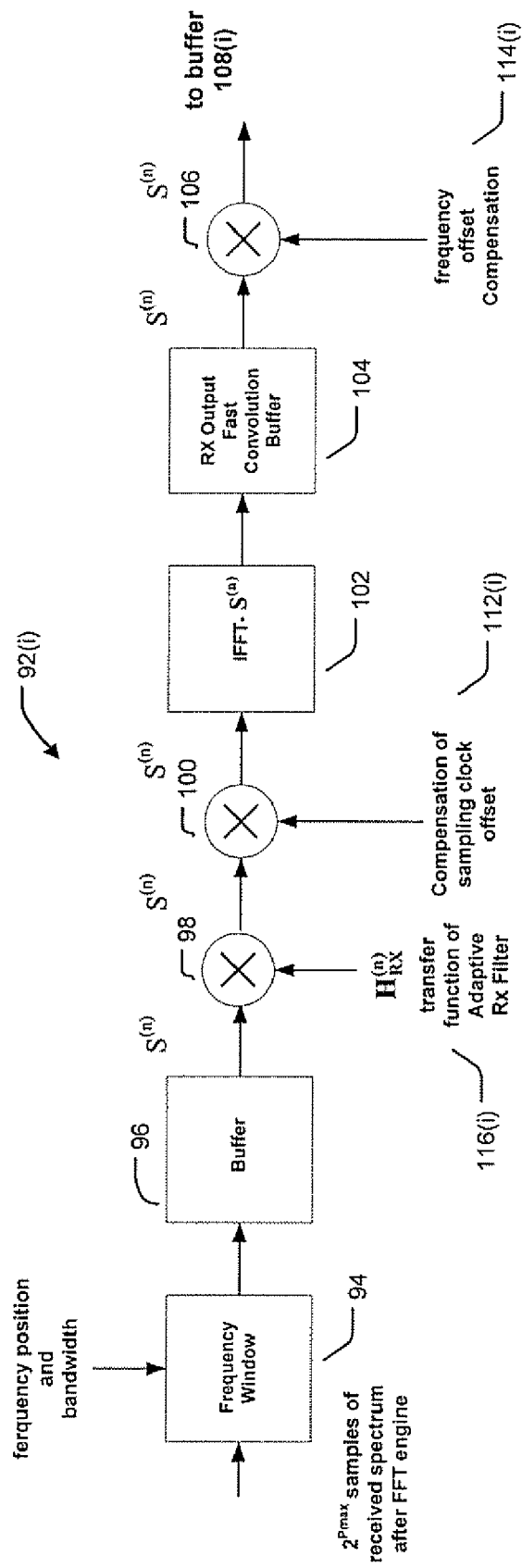
FIG. 8 shows a block diagram of the filtering and IF downsampling section of the multi-channel OFDM receiver of FIG. 7.

The receive OFDM engine block 92($i$) is shown in greater detail in FIG. 8. The frequency window 94 identifies the length $S^{(n)}$ portion of the length $2^{Pmax}$ frequency spectrum from FFT 90 corresponding to sub-channel n. The length $S^{(n)}$ portion representing the frequency spectrum of sub-channel n is copied to length $S^{(n)}$ block at buffer 96. The length $S^{(n)}$ block output from buffer 96 is multiplied by a length $S^{(n)}$ FFT of the channel n FIR receive filter function at filter function 98.

The receive filter function for channel n is $h_{RX}^{(n)}$ and has a length of $N_{h,RX}^{(n)}$ filter coefficients. As with the OFDM transmitter, it is desirable that the filter function be time shifted to correct for any filter group delays or blocking delays. Let $$A_{RX}^{(n)} = \text{length } S^n FFT \text{ of } h_{RX}^{(n)} \quad (21)$$

$$A_{RX}^{(n)}(f) = \text{value of } A_{RX}^{(n)} \text{ at frequency } f \quad (22)$$

Where $h_{RX}^{(n)}$ is extended by $S^n - N_{h,RX}^{(n)}$ zeros to perform the transform and f is a frequency value on the length $S^{(n)}$ FFT frequency grid with sampling frequency $F_N^{(n)}$. The recommended (time shifted) filter transfer function $$H_{RX}^{(n)}$$

to be employed in filter function 98 is $$H_{RX}^{(n)}(f) = \begin{cases} A_{RX}^{(n)}(f)e^{-j2\pi f\left(u^n - \frac{N_{RX}^{(n)}-1}{2}\right)} & \text{for Overlap-and-Save} \\ A_{RX}^{(n)}(f)e^{j2\pi f\left(\frac{N_{RX}^{(n)}-1}{2}\right)} & \text{for Overlap-and-Add} \end{cases} \quad (23)$$

A linear phase correction is applied to each frequency value of the output from filter function 98 in multiplier 100 for the purpose of correcting for a sampling clock offset in a manner known in the art. The output length $S^{(n)}$ sequence is processed using a length $S^{(n)}$ IFFT 102 to convert the signal from the frequency to time domain. The length $S^{(n)}$ time series output from IFFT 102 is passed to an output fast convolution buffer 104.

For signals transmitted using the Overlap-and-Save method the first $u^{(n)}$ points need to be discarded from the beginning of each length $S^{(n)}$ block in fast convolution buffer 104. For signals transmitted using the Overlap-and-Add method the last $u^{(n)}$ points of one block need to be overlapped and added with the first $u^{(n)}$ points of the next block in buffer 104. The remaining points of the output blocks are sent to the frequency offset compensation multiplier 106 where the time series is frequency shifted via multiplication by a exponential signal representing the complex conjugate of a sinusoid with a frequency equal to the offset in a manner known in the art. The corrected signal is then forwarded to buffer 108($i$).

The calculation of the number of fast convolution blocks $$N_{FC}^{(n)}$$

for the receiver required to process a length $N_S^{(n)}$ sequence of OFDM symbols for a given sub-channel is the same as equation (17) with $v^{(n)}$ replaced with $u^{(n)}$. Similarly, the number of samples to discard from the last fast convolution block in the receiver is $N_{Discard}^{(n)}/Q_n$ but with $v^{(n)}$ replaced with $u^{(n)}$ in equation (18). For the same reasons mentioned above in respect of the OFDM transmitter, it is recommended to use the Overlap-and-Save method for values of $S^{(n)}$ and $u^{(n)}$ that result in $N_{Discard}{}^n=0$ for all sub-channels. A possible choice is $S^{(n)}=2N^{(n)}$ and $u^{(n)}=v^{(n)}=N^{(n)}-L^{(n)}$. This has the additional advantage that $$N_{FC}^{(n)} = N_S^{(n)}$$

for the receiver so that each input fast convolution block results in an OFDM symbol as its output.

In summary, in a preferred embodiment, the OFDM receiver 80 receives a plurality of OFDM-modulated sub-channels from a number of independent transmitters. The combined signal arising from all sub-channels are loaded into a buffer and processed using a FFT 90 to decompose the signal into its frequency components (carriers). Sets of frequency components corresponding to single sub-channels are each forwarded to a respective receive OFDM engine 92(i). The process of extracting a set of carriers for one sub-channel from the FFT 90 represents digital down conversion of the sub-channel. The sub-channel is filtered to limit the effect of out-of-band signals using a fast convolution filter comprising a stage where the sub-channel frequency components are multiplied by a filter transfer function at mixer 116, converted back to the time domain using IFFT 102 and of filter transients (due to the block-based processing) removed using the output RX fast convolution buffer 104. Following the combined down conversion/fast convolution filtering process the samples are sent to a buffer 108 whereupon a final FFT 118 within a standard OFDM FFT receiver is performed to extract the individual OFDM carriers of the sub-channel. Standard decoding follows to recover the data stream. Carrier recovery methods are applied to correct for synchronization offsets in the received signal. Standard techniques can be employed in the generic OFDM FFT receiver of item 118 of FIG. 7 to measure these offsets. Embedded in each Fast Convolution filtering chain (RX OFDM engine) are corrections for the sampling clock offset and carrier frequency offset. OFDM symbol offsets are corrected outside the combined downconversion/fast convolution filtering processor (items 90 and 92 of FIG. 7)

In a preferred embodiment, the communication system of the present invention comprises a set of OFDM transmitters 50 and at least one OFDM receiver 80. Each transmitter has the dynamic capability to generate a number of sub-channels of different bandwidths at different positions in a communication channel. Each receiver has the same dynamic ability to receive data from a large number of such sub-channels broadcasted by a number of transmitters.

The present invention would be particularly useful for the upstream link of a multi-user communications channel where a number of subscribers send data to one or more central base stations. A separate downstream channel separated in frequency from the upstream channel can be used to send data from the base stations to the subscribers. Subscribers can openly contend for system resources or be assigned resources on a demand basis. The chief resources to share are a set of sub-channels (maximum of $2^{q^{max}}$) and time slots within each sub-channel. Hence, the communications system of the present invention combines frequency division multiple access (FDMA) and time division multiple access (TDMA) resource sharing. With the high scalability of the design (variable length bursts, variable position/number/bandwidth of sub-channels) the upstream component of the communication link (subscriber to basestation) has a high degree of flexibility in maximizing throughput.

Although the communications system has been described largely in the context of the upstream link of a multiple user access system where sub-channels can be assigned, it could also be used in a number of different configurations. Examples of alternate configurations employing the same multi-channel OFDM technology of the present invention include, but are not limited to:

(a) Use of the multi-channel OFDM sub-channel design for the downstream link of a multiple access communication. With reference to FIG. 2, a number of transmitters 50 (designated as a set of remote stations) transmit to at least one receiver 80 (designated as a head-end station). An alternate design is to place a transmitter 50 at the head-end station to transmit multiple sub-channels to one or more remote stations each employing a receiver 80. Each remote station receiver 80 will decode a sub-set of the channels generated by the head-end station transmitter 50. Hence, the same multi-channel OFDM design can be employed for both directions of a bi-directional communication link by placing a transmitter 50 and receiver 80 at each station.

(b) The maximum transform length (determined by the parameter $P_{max}$) to set the channel bandwidth can have a different value for the OFDM transmitter 50 and the OFDM receiver 80. Though more robust to permit each transmitter 50 to select any part of the channel spectrum, it is possible to restrict a transmitter to work within a contiguous sub-set of sub-channels. This will require the transmitter 50 to employ a smaller value of $P_{max}$ relative to that of the OFDM receiver 80. In order for the group of sub-channels generated by each OFDM transmitter 50 to take its assigned position in the channel (channel bandwidth set by value of $P_{max}$ for the receiver 80), both the D/A 68 and RF transmitter 70 circuitry employed for frequency upconversion will need have a different center-frequency for each transmitter 50.

(c) A frequency hopping system where a user changes sub-channels in a pseudo-random manner as opposed to the structured allocation of sub-channels typical of many multiple access systems. The dynamic structure of the OFDM transmitter and receiver design makes it highly suitable for a frequency hopping system.

(d) Replacement of a Fast Fourier Transform (FFT) structure with a power-of-two size transform size with a Discrete Fourier Transform (DFT) structure with a non power-of-two transform size. Though a FFT is far more efficient computationally, the same fast convolution algorithms for an OFDM transmitter and OFDM receiver apply equally well for a DFT transform as well as a FFT transform.

While the invention has been described in terms of various specific embodiments, those skilled in the art will recognize that the invention can be practiced with modification within the spirit and scope of the claims.

We claim:

1. A receiver for receiving a combined OFDM signal that includes a plurality of sub-channel OFDM signals, the receiver including:

a buffer and FFT for receiving the combined OFDM signal and performing an FFT thereon to output a frequency domain signal, each of the sub-channel OFDM signals occupying assigned frequency ranges within the frequency domain signal;

a plurality of processing chains each associated with a sub-channel and each including:

(i) a fast convolution filter and digital downconverter for extracting from the FFT of the combined OFDM signal the sub-channel OFDM signal occupying the assigned frequency range of the associated sub-channel and performing an IFFT on the extracted sub-channel OFDM signal;

(ii) an OFDM demodulator for demodulating the sub-channel OFDM signal output from the fast convolution and digital downconvertor.

2. The receiver of claim 1 wherein the fast convolution filter and digital downconverter includes:

a frequency window filter for extracting from the FFT of the combined OFDM signal the sub-channel OFDM signal occupying the assigned frequency range of the associated sub-channel;

a fast convolution filter for multiplying the extracted sub-channel OFDM signal with a filter transfer function to remove out-of-band signals;

an IFFT for converting the filtered extracted sub-channel signal to the time domain; and an output buffer for removing filter transients from the output of the IFFT.

3. The receiver of claim 1 wherein the fast convolution filter and digital downconverter applies overlap-and-save fast convolution filtering to the extracted sub-channel OFDM signal and includes an output buffer for discarding from successive processing blocks in the extracted sub-channel OFDM signal portions that overlap in time with portions of preceding processing blocks.

4. The receiver of claim 1 wherein the fast convolution filter and digital downconverter applies overlap-and-add fast convolution filtering to the extracted sub-channel OFDM signal and includes an output buffer for adding portions of processing blocks in the extracted sub-channel OFDM signal output from the IFFT to portions of preceding processing blocks that overlap in time.

5. A method for receiving a combined OFDM signal that includes a plurality of sub-channel OFDM signals, including:

receiving the combined OFDM signal and performing an FFT thereon to output a frequency domain signal, each of the sub-channel OFDM signals occupying assigned frequency ranges within the frequency domain signal;

for each of the assigned sub-channel frequency ranges, applying fast convolution filtering and digital downconversion to extract from the FFT of the combined OFDM signal the sub-channel OFDM signal occupying the assigned frequency range and performing an IFFT on the extracted sub-channel OFDM signal; and demodulating in parallel each of the extracted sub-channel OFDM signals to produce respective base-band digital signals each associated with a respective one of the sub-channels.

* * * * *